May 1, 1934.  D. K. WARNER  1,957,414
BAROMETRIC CONDENSER
Filed March 13, 1930
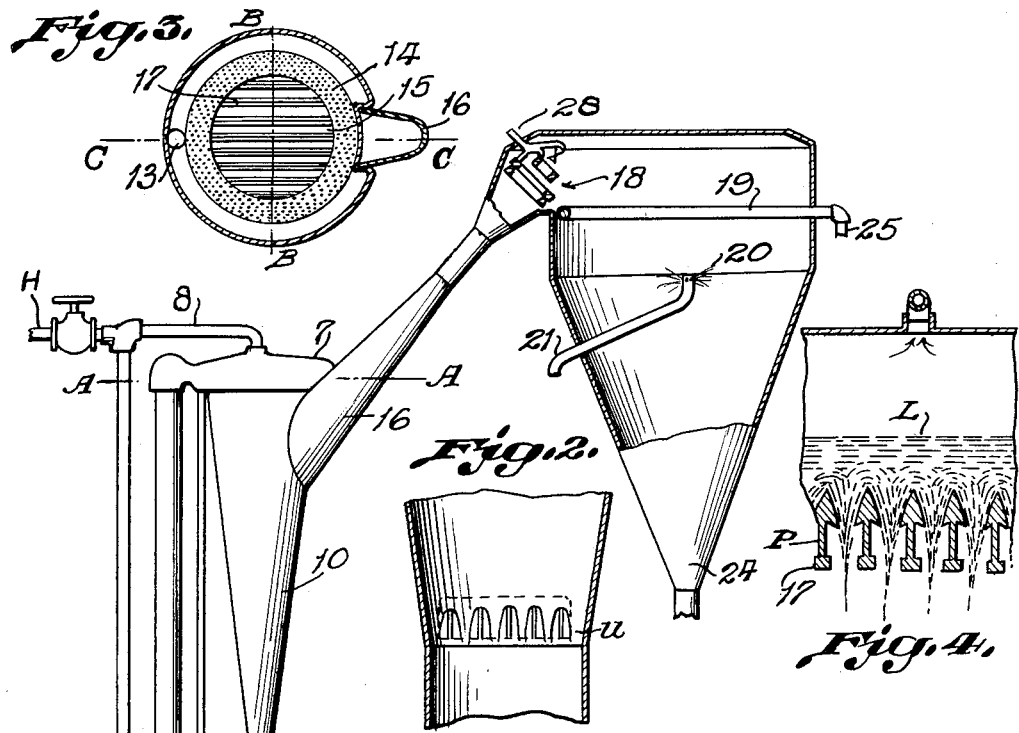
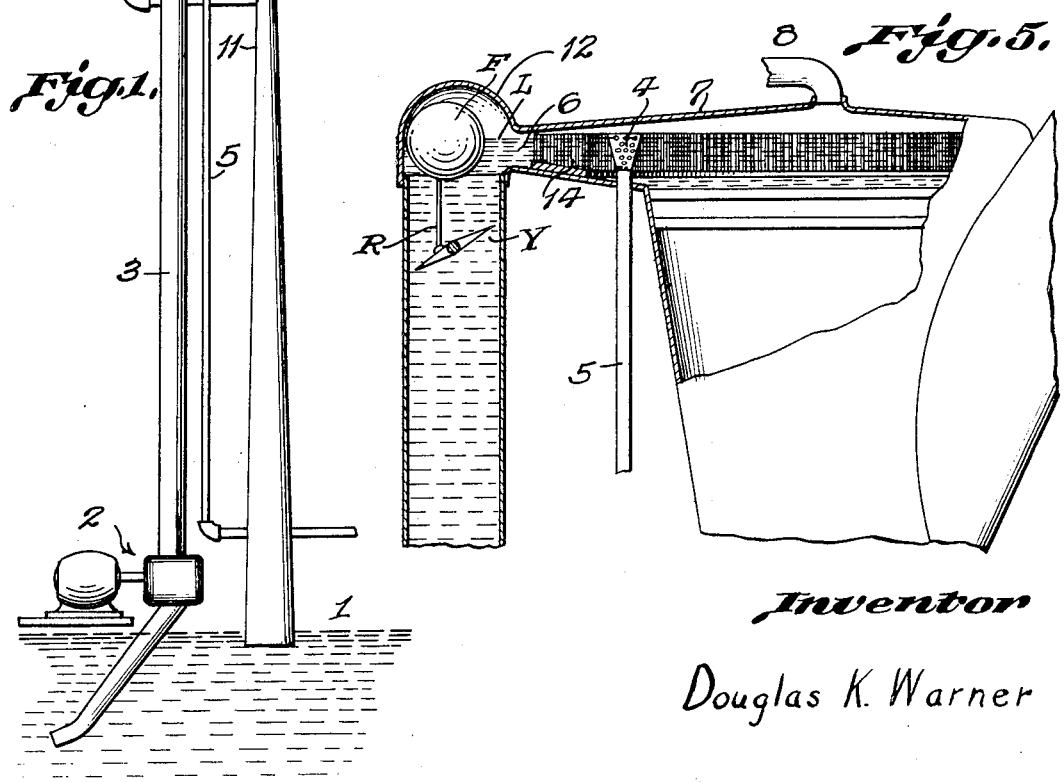
Inventor
Douglas K. Warner Patented May 1, 1934

1,957,414

UNITED STATES PATENT OFFICE 1,957,414

BAROMETRIC CONDENSER

Douglas K. Warner, Watkins Glen, N. Y.

Application March 13, 1930, Serial No. 435,451

5 Claims. (Cl. 261—116)

My invention relates to improvements in barometric condensers the object being to produce a very high vacuum with a small consumption of power. To make this clearer I define a barometric condenser as an apparatus which with the aid of atmospheric or barometric air pressure apparently sucks water up into a chamber in which steam at a pressure below that of the surrounding atmosphere is brought in contact with the water and the resulting condensed steam and water removed.

The invention is fully shown in the accompanying drawing in which;— Figure 1 is a transverse vertical section of a complete brine freezing plant in which vapor is sucked from the brine and blown by concentric ring steam jets into falling sheets of water from which the air has been previously removed.

Fig. 2 is an elongated sectional view of the throat of the condenser at about half the height from the water level to the top of the condenser.

Fig. 3 is a plan view of the deaerating overhead water chamber of the condenser taken thru AA of Fig. 1.

Fig. 4 is a section of the same water chamber taken thru BB of Fig. 3 showing grate bars P for originally dividing the water into sheets and the level L of the water close above them.

Fig. 5 is an enlarged view of a vertical section of the upper part of the condenser and water chamber and water uptake pipe showing a float valve for regulating the water supply and the needles or wire screen for catching small air bubbles.

In Fig. 1 numeral 1 shows a river, basin, or lake for the condenser water with inlet pipe 3 extending out to deep water thereof for obtaining the coldest water. Pump 2 assists in elevating the water to the level L, 32 feet above the water level in the basin 1. Because of the relatively high vacuum above the water, air contained in the water expands and tends to rise to the surface. The water then partially deaerated passes around chamber 12 and thru openings 6 over an inner circular plate 14 which is covered with vertical needles wires or screens which act as catching points for the remaining air which is starting to come out of the water.

The deaerated water then spreads out over the grate bars 17 which lie within circular plate 14 and thence drops between the bars into condenser proper 10. The water is very shallow over the grate bars but sufficiently deep to permit the most remote parts to be covered with water. Considerable variations in the amount of water pumped or sucked will result in small variation in the depth of water above the grate bars since a slight increase in head such as from $\frac{1}{4}$ to one inch will double the flow between the bars 17. To maintain a fairly constant flow with varying barometers a float valve Y attached by rod R to float F in chamber 12 prevents filling of the condenser head when the barometer is high or during high water. The pipe 8 carries the separated air collected in dome 7 down the throat 9 of the condenser where it is aspirated into the rapidly falling water again. Any other type of pump may of course be connected to pipe 8 thru valve H such as that used in starting the condenser, the object being the removal of the air caught by screens and reduction of the air pressure above the water, as well as preventing this air from getting into the condenser.

If the height of the water above the grate bars is 3 inches the water velocity between the bars will be 4 ft. per sec. while with a $\frac{3}{4}$ inch head the velocity would be 2 ft. per sec. assuming no other pressure differential. The air pressure above the water increases this velocity of flow tremendously so that unless the air is effectively removed from the water and from the water chamber a water velocity of no less than 23 ft. per sec may be expected which is the velocity resulting from $8\frac{1}{4}$ ft. head which is the head customarily used when air is not removed from the water chamber. The cost of pumping water against an 8 to 10 foot head is of course greater than pumping against a 3 inch head. For each cubic foot of water handled almost an equal volume of air must be removed from the water before it enters the condenser so that a large capacity vacuum pump must be employed. The ejector action of the water falling 30 feet per sec. at the throat of the condenser say 14 feet below the entering grates makes this high capacity pump. Air from the condenser top is led in at openings under the inverted U bars U of Fig. 2 which cross the throat in a direction parallel to the grate bars in the head. The water passing the lower edges of the U's sucks the air along with it and then entering the expanding nozzle below, the water velocity energy is converted back to pressure and the air squeezed into small bubbles and the whole dropped out against atmospheric pressure.

Pipe 5 removes some of the deaerated water for making such products as frozen brine so a funnel shaped screen 4 is placed at the entrance to the pipe and the required water drawn off. Mixed with brine this may be sprayed into the freezing chamber cone 20 of Fig. 1 thru pipe 21 where it is frozen by evaporation, the weak brine ice being washed out by stronger brine thru the barometric leg 24. Evaporation is effected by removal of the brine vapor by entrainment in steam jets 18 and compression to condenser pressure in nozzle 16. The vapor enters the condenser in a downward direction passing between the sheets of water admitted between the grate bars. Some of the sheets do not extend all the way out to the edge nearest the ejector so that steam is given better access to all the sheets as shown at 15.

In Fig. 4 L represents the water level and P the formed grate bars which permit the water to enter slowly so that the sheets will rapidly thin out after passing a possible point of clogging between the bars.

It will be seen that the condenser comprises a novel design in which the usual splash effect is replaced by entering water at low velocity and not interfering with the natural increase in velocity due to gravity. The sheets are also caused to squeeze together so as to entrain and compress vapors. The condenser employs the principle of particularly complete deaeration of the water before entrance. Wire mesh or needle projections in shallow moving water exposed to high vacuum help release the air. Water is introduced with such slight pressure that the openings are larger and less easily clogged, and the water surface in the condenser greater. The steam velocity is utilized to increase the water velocity and to blow air into the narrowing spaces between the water sheets and so carry it off.

I do not restrict the invention to any particular form of water deaeration or sheets of water. I use the sheets of water as air compressors within the condenser, at the throat, and in the tail pipe.

Having thus described my invention what I claim as new and desire to secure by Letters Patent is:

1. A barometric condenser having a deaerating chamber in its upper portion and a condensing chamber in its lower portion, means, assisted by atmospheric pressure, for supplying water to said deaerating chamber, means for removing air from said water comprising means for reducing the pressure above the surface of the water in said chamber, and comprising also a body of material through which the water is caused to flow, said material being designed to catch and liberate minute air bubbles, said pressure reducing means also operating to carry away said liberted air, and means for introducing the deaerated water in said condensing chamber.

2. A barometric condenser having a deaerating chamber in its upper portion and a condensing chamber in its lower portion, said condensing chamber consisting of a long vertical tube contracted to form a throat at about half its height, means for admitting water in the form of sheets from said deaerating chamber into said condensing chamber, and means for admitting steam in a downward direction between said sheets.

3. A barometric condenser having a long vertical tube with a contracted throat portion about half way of its height, a water deareating chamber located above said tube, means for removing air from the water in said deaerating chamber and means for removing said air from said deaerating chamber and reintroducing same into the water in the vicinity of said throat.

4. A barometric condenser comprising a vertical tube converging to form a throat, a water deaerating chamber above said tube, having means for removing and liberating entrained air from the water in said chamber, inverted U troughs in said tube in the vicinity of said throat, and means for conducting air from the space above the water in said chamber to the space beneath said U troughs whereby water falling in said tube will draw air from the space above the water in said chamber.

5. A barometric condenser having a deaerating chamber in its upper portion and a condensing chamber in its lower portion, means for removing and liberating air from the water in the said upper portion and means for removing a portion of the deaerated water from said upper chamber for purposes requiring deaerated water.

DOUGLAS K. WARNER.